(12) United States Patent
Ishii et al.

(10) Patent No.: US 10,315,605 B2
(45) Date of Patent: Jun. 11, 2019

(54) STEERING WHEEL

(71) Applicant: TOYODA GOSEI CO., LTD., Kiyosu-shi, Aichi-ken (JP)

(72) Inventors: Tsutomu Ishii, Kiyosu (JP); Toshihito Yanagisawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 322 days.

(21) Appl. No.: 15/258,363

(22) Filed: Sep. 7, 2016

(65) Prior Publication Data
US 2017/0072985 A1 Mar. 16, 2017

(30) Foreign Application Priority Data

Sep. 10, 2015 (JP) ................. 2015-178645

(51) Int. Cl.
*B60R 21/203* (2006.01)
(52) U.S. Cl.
CPC .................. *B60R 21/2037* (2013.01)
(58) Field of Classification Search
CPC .................................. B60R 21/2037
See application file for complete search history.

(56) References Cited

U.S. PATENT DOCUMENTS

| | | | |
|---|---|---|---|
| 5,544,871 A | 8/1996 | Reinemuth et al. | |
| 6,062,592 A * | 5/2000 | Sakurai | B60Q 5/003 280/728.2 |
| 6,881,911 B2 * | 4/2005 | Sugimoto | B60Q 5/003 200/61.54 |
| 7,268,309 B2 * | 9/2007 | Sugimoto | B60Q 5/003 200/61.54 |
| 7,464,959 B2 * | 12/2008 | Pillsbury, IV | B60Q 5/003 200/61.55 |

(Continued)

FOREIGN PATENT DOCUMENTS

| | | |
|---|---|---|
| JP | H07-83279 A | 3/1995 |
| JP | 2014-111426 A | 6/2014 |
| WO | 2016/042850 A1 | 3/2016 |

OTHER PUBLICATIONS

Office Action dated Aug. 16, 2018 issued in corresponding JP patent application No. 2015-178645 (and English translation).

(Continued)

*Primary Examiner* — Nicole T Verley
(74) *Attorney, Agent, or Firm* — Posz Law Group, PLC

(57) ABSTRACT

A steering wheel includes: a support member inserted into a bag holder of an air bag device; a cylindrical slider; an annular damper holder configured to cover a part of the cylindrical slider; and an elastic member including an annular elastic main body interposed between the cylindrical slider and the annular damper holder, wherein: the air bag device configured to act as a damper mass of a dynamic damper; the annular elastic main body configured to act as a spring of the dynamic damper; an annular gap is formed with the elastic member at a portion shifted in the axial direction from the annular elastic main body; and the elastic member further includes elastic restriction portions configured to fill the annular gap to restrict the elastic deformation of the elastic member at the multiple portions of the annular gap spaced from each other in the peripheral direction.

6 Claims, 11 Drawing Sheets

(56) References Cited

U.S. PATENT DOCUMENTS

| | | | |
|---|---|---|---|
| 8,556,292 B2* | 10/2013 | Umemura | B62D 7/222 |
| | | | 280/731 |
| 8,720,942 B2* | 5/2014 | Onohara | B60R 21/2037 |
| | | | 200/61.55 |
| 8,733,203 B2* | 5/2014 | Kondo | B60Q 5/003 |
| | | | 280/731 |
| 8,794,662 B2* | 8/2014 | Ishii | B60R 21/2037 |
| | | | 280/731 |
| 8,985,623 B2* | 3/2015 | Kondo | B60R 21/2037 |
| | | | 280/731 |
| 9,195,257 B2* | 11/2015 | Miyahara | B60R 21/2037 |
| 9,403,552 B2* | 8/2016 | Onohara | B60R 21/2037 |
| 9,561,772 B2* | 2/2017 | Andersson | B60R 21/2037 |
| 10,023,221 B2* | 7/2018 | Obayashi | B60Q 5/003 |
| 2014/0131982 A1 | 5/2014 | Ishii et al. | |
| 2017/0144594 A1* | 5/2017 | Obayashi | B60Q 5/003 |

OTHER PUBLICATIONS

Office Action dated Dec. 14, 2018 issued in corresponding DE patent application No. 102016116983.8 (and English translation).

* cited by examiner

STEERING WHEEL

CROSS-REFERENCE TO RELATED APPLICATION(S)

This application is based upon and claims the benefit of priority from Japanese Patent Application No. 2015-178645, filed on Sep. 10, 2015, the entire contents of which are incorporated herein by reference.

BACKGROUND

1. Field of the Invention

The invention relates to a steering wheel to be rotationally operated when changing the advancing direction or retreating direction of a conveyance such as a vehicle.

2. Description of the Related Art

An example of steering wheels includes an air bag device which, when an impact is applied to a vehicle from ahead, protects a driver against such impact (see, for example, JP-A-2014-111426). As shown in FIG. 16, this steering wheel 50 includes a support member 51, a slider 52, a damper holder 53 and an elastic member 54. The support member 51, while being inserted in a bag holder 56 of the air bag device 55, is supported by a core metal 57 of the steering wheel 50. The slider 52 has a cylindrical shape and is placed on the support member 51 to be slidable longitudinally along the axis thereof. The damper holder 53 has an annular shape and covers part of the axial-direction area of the slider 52. The elastic member 54 includes an annular elastic main body 54a interposed between the slider 52 and damper holder 53. The elastic member 54 includes, in such portion thereof as adjoins the front side of the elastic main body 54a, an annular gap G extending in the peripheral direction of the elastic member 54. The gap G is constituted of an annular groove opened in the front end face of the elastic member 54.

In the above structured steering wheel 50, the air bag device 55 functions as a damper mass of a dynamic damper and the elastic main body 54a functions as a spring of the dynamic damper. Thus, when the steering wheel 50 vibrates in the vertical direction or in the right-and-left direction, the elastic main body 54a, while elastically deforming at the same or near to the frequency of such vibration, vibrates with the air bag device 55, thereby absorbing the vibration energy of the steering wheel 50. Such absorption suppresses (restricts) the vibration of the steering wheel 50.

However, as disclosed in JP-A-2014-111426, in the structure that the annular gap G is formed in the elastic member 54, when the steering wheel 50 vibrates, besides the elastic deformation of the elastic main body 54a, such portion of the elastic member 54 as faces the gap G deforms elastically in the gap G. After the vibration is suppressed by the elastic deformation of the elastic member 54, the steering wheel 50 vibrates in the vertical direction and in the right-and-left direction and also, as shown by the arrow in FIG. 16, oscillates with the elastic member 54 as the fulcrum thereof. This influences the frequency characteristics of the vibration suppressed by the elastic main body 54a, thereby making them unstable.

Here, the above phenomenon may also be suppressed by filling the whole periphery of the above gap. However, in this case, to a reacting force caused by the elastic deformation of the elastic main body 54a, there is added a reacting force caused by filling the gap G, thereby making the elastic member 54 hard to deform elastically. Thus, similarly to the above case, the frequency characteristics of the vibration are unstable.

SUMMARY

The invention is made in view of the above circumstances and thus has an object to provide a steering wheel capable of stabilizing the frequency characteristics of the vibration to be suppressed by the elastic main body.

According to an aspect of the invention, there is provided a steering wheel, including: a support member inserted into a bag holder of an air bag device; a cylindrical slider placed longitudinally slidably over the support member; an annular damper holder configured to cover a part of an axial-direction area of the cylindrical slider; and an elastic member including an annular elastic main body interposed between the cylindrical slider and the annular damper holder, wherein: the air bag device configured to act as a damper mass of a dynamic damper; the annular elastic main body configured to act as a spring of the dynamic damper; an annular gap, extending in the peripheral direction of the elastic member, is formed with the elastic member at a portion shifted in the axial direction from the annular elastic main body; and the elastic member further includes elastic restriction portions configured to fill the annular gap to restrict the elastic deformation of the elastic member at the multiple portions of the annular gap spaced from each other in the peripheral direction.

According to the above structure, when the steering wheel vibrates, the air bag device functions as the damper mass of the dynamic damper and the elastic main body functions as the spring of the dynamic damper.

Thus, when the steering wheel vibrates in the vertical direction or in the left-and-right direction, the elastic main body of the elastic member elastically deforms at resonance frequencies identical with or close to the target frequencies of the vibration of the steering wheel to vibrate with the air bag device, thereby absorbing the vibration energy of the steering wheel to suppress (restrict) the vibration of the steering wheel.

In this case, in such location of the elastic member as is shifted in the axial direction from the elastic main body, there exists the annular gap extending in the peripheral direction of the elastic member. However, the multiple locations of the gap spaced from each other in the peripheral direction are filled by the elastic restriction portions. The restriction portions restrict the locations of the gap filled by the restriction portions from deforming elastically. This restriction prevents the steering wheel from oscillating with the elastic member as the fulcrum thereof.

Meanwhile, as described above, formation of the elastic restriction portions adds a reacting force caused by the restriction portions filling the gap to a reacting force caused by the elastic deformation of the elastic main body, thereby making the elastic member harder to deform elastically. However, the restriction portions are formed at the multiple locations of the gap spaced from each other in the peripheral direction of the gap. Therefore, when compared with a structure where the whole gap is filled by restriction portions, an increase in the reacting force caused by addition of the restriction portions is small.

As a result, the frequency characteristics of vibrations suppressed by the elastic main body are harder to be influenced from the remaining locations of the elastic member and are thereby stabilized.

In the above steering wheel, preferably, the elastic member may include an elastic cylindrical part having a diameter smaller than the minimum diameter part of the annular damper holder at a portion adjacent to the front side of the annular elastic main body, the annular gap may be formed between the outer peripheral surface of the elastic cylindrical part and the minimum diameter part of the annular damper holder, and the restriction portions may be respectively formed on the outer peripheral surface of the elastic cylindrical part.

According to the above structure, between the minimum diameter part of the damper holder and the elastic cylindrical part of the elastic member existing adjacent to the front side of the elastic main body and having a smaller diameter than the minimum diameter part, there is formed the gap. The restriction portions formed at the multiple locations of the outer peripheral surface of the elastic cylindrical part spaced from each other in the peripheral direction fill the multiple locations of the gap in the peripheral direction. The restriction portions restrict the elastic cylindrical part serving as such part of the elastic member as faces the gap from being elastically deformed in such locations of the gap as intervene between the minimum diameter part and itself.

Also, formation of the multiple restriction portions is limited to the multiple locations of the outer peripheral surface of the elastic cylindrical part spaced from each other in the peripheral direction, thereby suppressing an increase in the reacting force caused by additional formation of the restriction portions.

In the above steering wheel, preferably, the annular damper holder may include an annular bottom wall part in the front end thereof, and the inner periphery of the bottom wall part may constitute at least a portion of the minimum diameter part of the annular damper holder.

According to this structure, the inner periphery of the bottom wall part formed in the front end of the damper holder constitutes at least a portion of the minimum diameter part of the damper holder. The elastic cylindrical part of the elastic member is smaller in diameter than the inner periphery (minimum diameter part) of the bottom wall part. And, the gap is formed between the outer peripheral surface of the elastic cylindrical part and at least the inner periphery of the bottom wall part, and the multiple restriction portions formed on the outer peripheral surface of the elastic cylindrical part fill the multiple locations of the gap in the peripheral direction. The restriction portions restrict such part of the elastic member as faces the gap from being elastically deformed in such locations of the gap as intervene between the minimum diameter part and itself, while an increase in the reacting force caused by additional formation of the restriction portions is suppressed.

The above steering wheel may preferably include further: an energizing member configured to energize the cylindrical slider backward; a cap member configured to cover at least the respective rear ends of the support member and the cylindrical slider while being spaced backward from the rear end of the cylindrical slider; a movable side contact part mounted within the cap member; and a fixing side contact part constituted of the rear end of the support member and configured to contact with the movable side contact part when operating a horn device, wherein: the annular damper holder may be mounted on the cap member; the annular damper holder may include a transmission part, constituting together with the inner periphery the minimum diameter part of the annular damper holder, in the inner periphery of the bottom wall part; and the cylindrical slider may include a part to be transmitted, to which the forward movement of the annular damper holder is transmitted through the transmission part, at the portion of the outer periphery thereof as exists just before the transmission part.

According to this structure, when the air bag device is not depressed, the load of the air bag device is transmitted to the slider mainly through the cap member, damper holder and elastic main body. Thus, when the steering wheel vibrates, the air bag device functions as a damper mass of a dynamic damper and the elastic main body functions as a spring of the dynamic damper, thereby enabling suppression of the vibration of the steering wheel.

In this case, the inner periphery of the bottom wall and transmission part of the damper holder constitute the minimum diameter part of the damper holder. The elastic cylindrical part of the elastic member is smaller in diameter than the minimum diameter part. And, the multiple peripheral direction locations of the gap between the outer peripheral surface of the elastic cylindrical part and minimum diameter part are filled by the multiple restriction portions formed in the outer peripheral surface of the elastic cylindrical part. The restriction portions restrict such part of the elastic member as faces the gap from deforming elastically in the gap, while an increase in a reacting force caused by additional formation of the restriction portions is suppressed.

Meanwhile, when the air bag device is depressed, a force applied to the air bag device is transmitted through the cap member to the movable side contact part and damper holder. The transmission of the force causes the damper holder forward together with the transmission part, the movement of the transmission is transmitted to the slider through the part to be transmitted, thereby sliding the slider forward against the energizing member. And, when the movable side contact part is moved forward together with the cap member and is contacted with the fixing side contact part of the rear end of the support member, the horn device is operated.

In the above steering wheel, preferably, the elastic member may include an elastic plate-shaped part, having a diameter larger than the elastic cylindrical part, in the front end of the elastic cylindrical part, the transmission part may be indirectly contacted with the part to be transmitted through the elastic plate-shaped part, and the restriction portions may be spaced backward from the elastic plate-shaped part.

According to this structure, when the air bag device is depressed, the cap member is pushed to move the damper holder forward. With this movement, the transmission part is moved forward and the movement thereof is transmitted indirectly to the part to be transmitted through the elastic plate-shaped part of the elastic member. This transmission causes the slider to slide forward against the energizing member.

Also, when the restriction portions are compressed in the vertical direction or in the right-and-left direction and are thereby deformed elastically, they are in part going to deform elastically in a manner to expand forward. Here, supposing the restriction portions are contacted with the elastic plate-shaped part existing in front of the restriction portions, the elastic plate-shaped part is going to prevent the forward elastic deformation of the restriction portions. Also, such contact generates a frictional force between the restriction portions and elastic plate-shaped part, thereby making the restriction portions further harder to elastically deform forward.

However, the restriction portions are spaced backward from the elastic plate-shaped part. The clearance between the restriction portions and elastic plate-shaped part allows the restriction portions to elastically deform forward. The restriction portions are hard to come into contact with the elastic plate-shaped part and thus a frictional force caused by contact is hard to be generated. The restriction portions are easy to elastically deform forward when compared with a structure where they are contacted with the elastic plate-shaped part. Thus, the influence of the restriction portions on the frequency characteristics of vibrations suppressed by the elastic main body is small.

In the above steering wheel, preferably, the restriction portions may be formed in an even number. One of the restriction portions may be arranged at a location opposed to the other restriction portion across the axis of the elastic member.

According to this structure, one of the multiple restriction portions is situated at a location opposed to the other restriction portion across the axis of the elastic member. Thus, the function to restrict the elastic deformation of such part of the elastic member as faces the gap and the function to suppress an increase in a reacting force caused by additional formation the restriction portions can be performed in good balance at locations opposed to each other across the axis of the elastic member, that is, on both sides in the vibration direction.

In the above steering wheel, preferably, the restriction portions may be arranged at equal angles in an even number and four or more locations around the axis of the elastic member.

According to this structure, when the steering wheel vibrates in the vertical direction or in the right-and-left direction, the function to restrict such part of the elastic member as faces the gap from elastically deforming in the gap and the function to suppress an increase in a reacting force caused by additional formation of the restriction portions can be fulfilled by the four or more restriction portions satisfying the above condition.

The effect to stabilize the frequency characteristics of vibrations suppressed by the elastic main body can be obtained regardless of the assembling position of the elastic member in the peripheral direction.

According to the above steering wheel, the frequency characteristics of vibrations to be suppressed by the elastic main body can be stabilized.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Description is given below of an embodiment of a vehicle steering wheel of the invention with reference to FIGS. 1~12.

Figure 1:
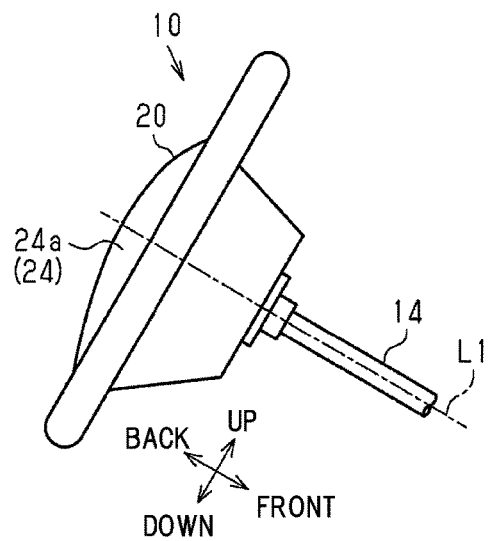
FIG. 1 is a side view of a vehicle steering wheel according to an embodiment of the invention.

As shown in FIG. 1, a vehicle includes a steering shaft 14 rotatable about an axis L1 inclined such that it increases in height backward. A steering wheel 10 is provided on the rear end of the steering shaft 14.

In this embodiment, when describing the respective parts of the steering wheel 10, the axis L1 of the steering shaft 14 is used as the reference. A direction along the axis L1 is called [the longitudinal direction] of the steering wheel 10 and, of directions along a surface perpendicular to the axis L1, a direction in which the steering wheel 10 erects is called the [vertical direction]. Thus, the longitudinal direction and vertical direction of the steering wheel 10 are slightly inclined with respect to the longitudinal direction (horizontal direction) and vertical direction (perpendicular direction) of a vehicle.

Figure 15:
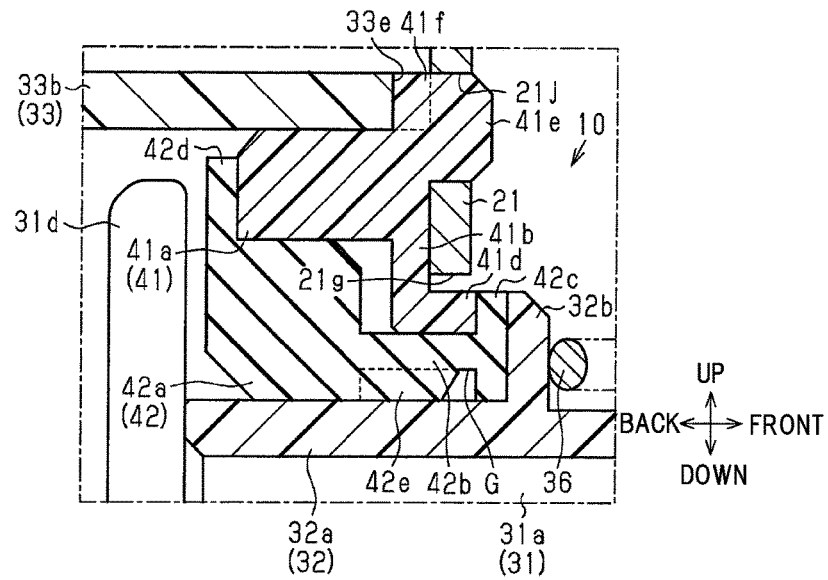
FIG. 15 is a partially longitudinal section view of a horn switch mechanism of the modification.
Figure 16:
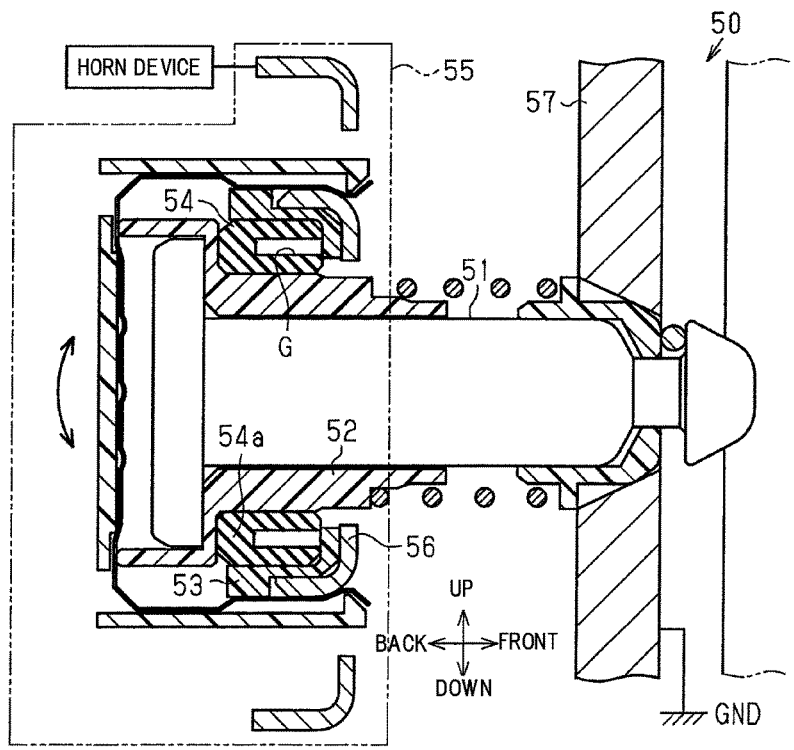
FIG. 16 is a partially longitudinal section view of the section structures of a conventional steering wheel.

Here, in FIGS. 3~10 and FIG. 12, for convenience sake, the longitudinal direction of the steering wheel 10 coincides with the horizontal direction and the vertical direction thereof coincides with the perpendicular direction. This applies similarly to FIGS. 13 and 15 showing a modification and FIG. 16 showing a prior art.

Figure 2:
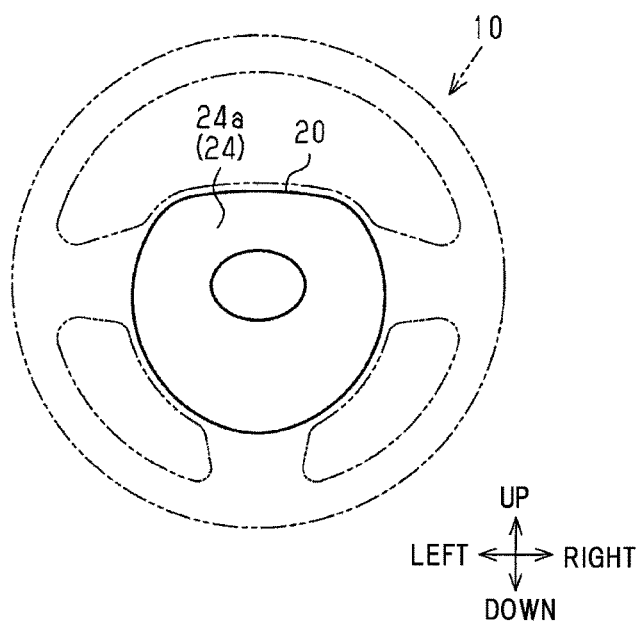
FIG. 2 is a front view of the steering wheel of the embodiment, showing the position relationship of an air bag device.
Figure 6:
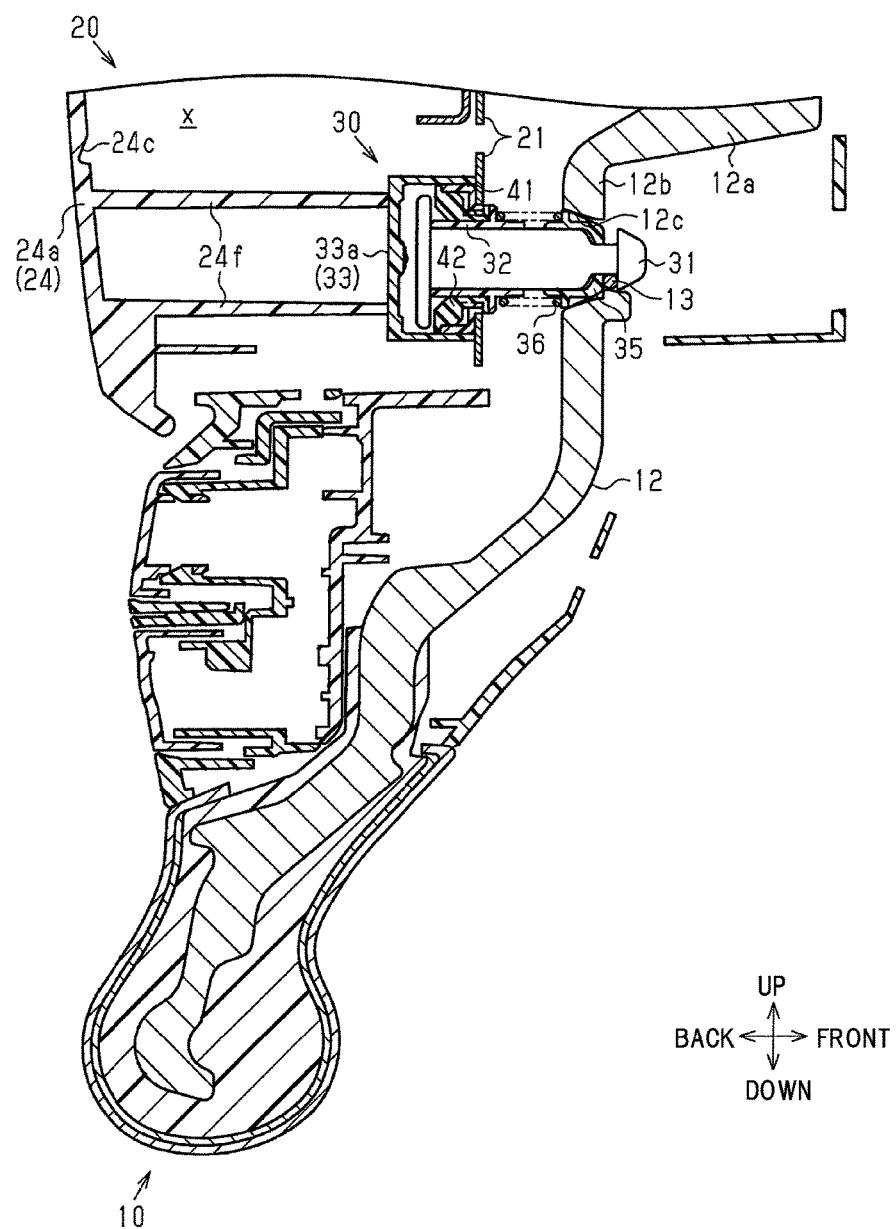
FIG. 6 is a partially longitudinal section view of the steering wheel of the embodiment.

As shown in FIG. 2, the steering wheel 10 includes an air bag device (air bag module) 20 in the central portion thereof. As shown in FIG. 6, the frame part of the steering wheel 10 is constituted of a core metal 12. The core metal 12 is made of iron, aluminum, magnesium or alloys thereof. The core metal 12 is mounted on the steering shaft 14 in a boss part 12a situated in the central portion thereof, and can rotate integrally with the steering shaft 14.

The core metal 12 includes, in the multiple locations of the boss part 12a, hold portions 12b each having a penetration hole 12c. The inner wall surface of each penetration hole 12c has a taper shape the diameter of which increases as it goes backward.

Figure 9:
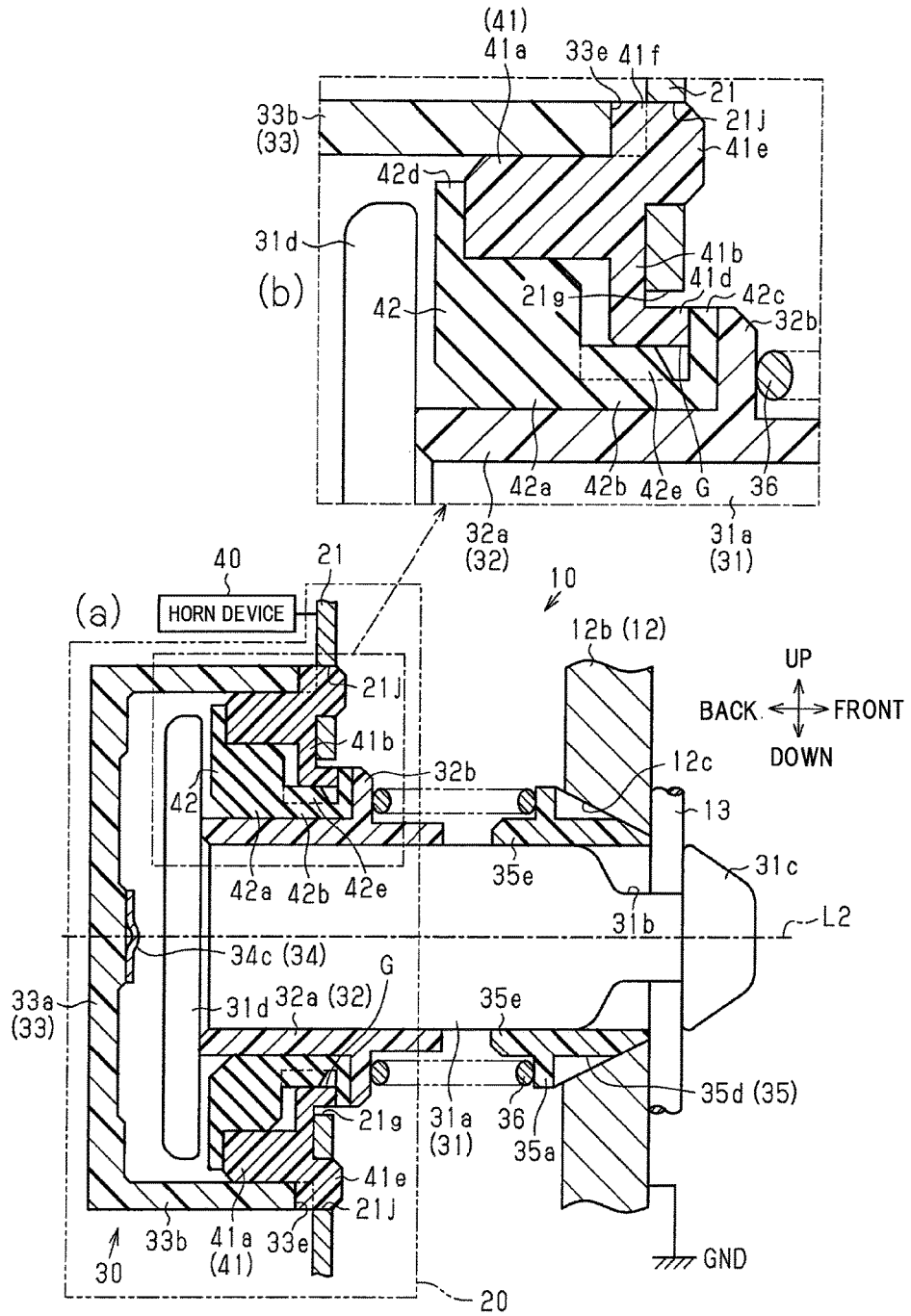
FIG. 9 is a partially longitudinal section view of the section structures of the horn switch mechanism and the peripheral portions thereof in the steering wheel of the embodiment, Section (b) of FIG. 9 being a partially longitudinal section view of a portion of Section (a) of FIG. 9 which is shown enlargedly.

As shown in Section (a) of FIG. 9, on the front side of each hold portion 12b, there is arranged a clip 13. The clip 13 is formed by bending a wire member made of conductive metal such as spring steel into a specific shape, and is in part contacted with the core metal 12. Part of each clip 13 is situated near to the front side of the penetration hole 12c.

A vehicle includes a horn device 40, and multiple horn switch mechanisms 30 (see FIGS. 3 and 7) for operating the horn device 40 are mounted on the hold portions 12b of the core metal 12 in a snap fit structure. The respective horn switch mechanisms 30 have the same structure. The air bag device 20 is supported on the core metal 12 through the horn switch mechanisms 30. Thus, the horn switch mechanisms 30 have a function to support the air bag device 20 and the switch function of the horn device 40.

Further, in this embodiment, between a bag holder 21 included in the air bag device 20 and horn switch mechanisms 30, there are interposed a damper holder 41 and an elastic member 42. And, the core metal 12, air bag device 20, horn switch mechanisms 30, damper holder 41, elastic member 42 and the like constitute a vibration control structure used to control, that is, damp the vibrations of the steering wheel 10. Next, description is given of the respective parts constituting the vibration control structure.

<Air Bag Device 20>

Figure 3:
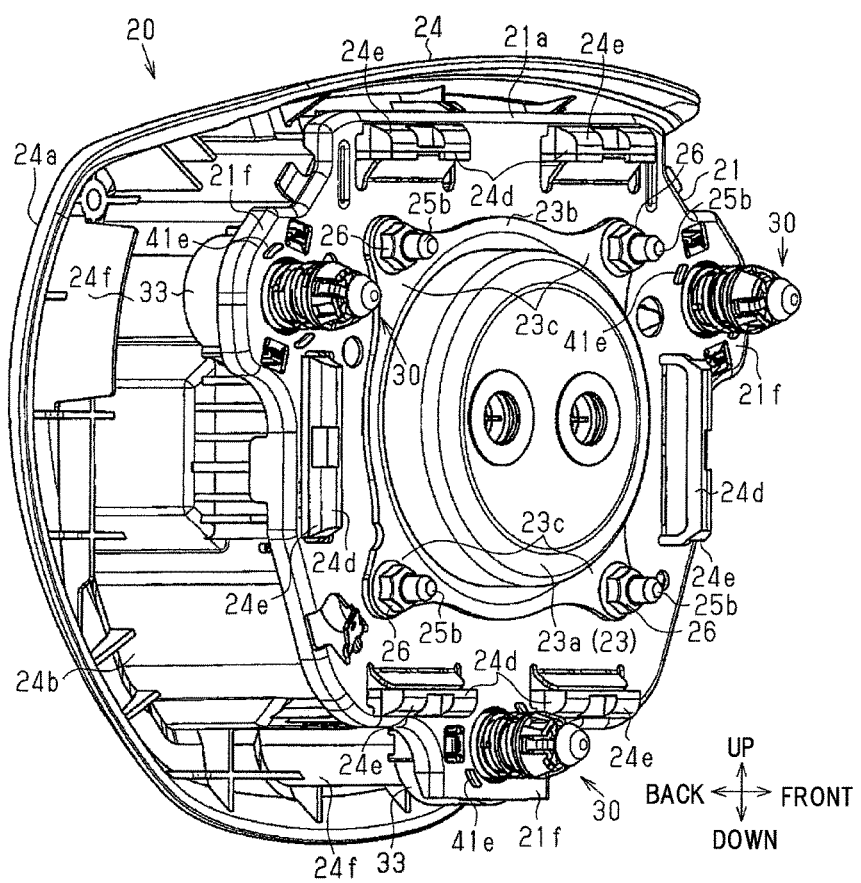
FIG. 3 is a perspective view of the air bag device of the steering wheel of the embodiment.
Figure 7:
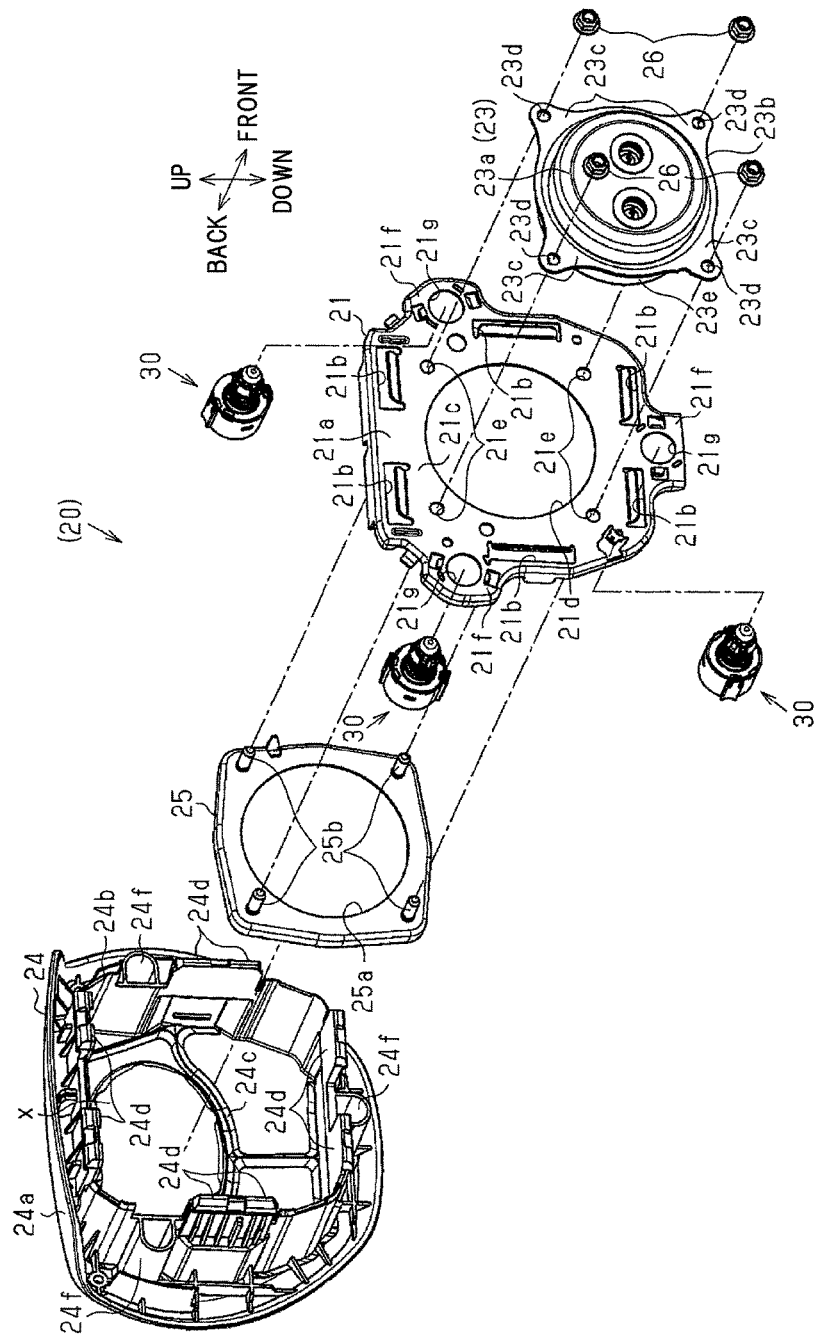
FIG. 7 is an exploded perspective view of composing parts of the air bag device of the steering wheel of the embodiment.

As shown in FIGS. 3, 6 and 7, the air bag device 20 is structured in such a manner that a pad part 24, a ring retainer 25, an air bag (not shown) and an inflator 23 are assembled to a bag holder 21.

The pad part 24 includes a skin portion 24a having a front surface (rear surface) serving as a design surface and a substantially square ring-shaped storage wall portion 24b erected on the back surface side (front side) of the skin portion 24a. A space surrounded by the skin portion 24a, storage wall portion 24b and bag holder 21 constitute a bag storage space x for storing mainly an air bag (not shown). In such location of the skin portion 24a as forms the bag storage space x, there is formed a reduced thickness portion 24c which can be pushed and broken when the air bag develops and expands.

The storage wall portion 24b includes, in the front end thereof, multiple engaging pawls 24d formed integrally therewith and each having a rectangular plate-like shape. Each engaging pawl 24d includes, in the front end thereof, an engaging projection 24e projecting in a direction to part away from the bag storage space x.

The pad part 24 includes, in the multiple locations thereof, switch support portions 24f for supporting the horn switch mechanisms 30. The switch support portions 24f are formed integrally with the storage wall portion 24b to extend from the skin portion 24a of the pad part 24 toward the back surface side (front side) thereof.

Figure 8:
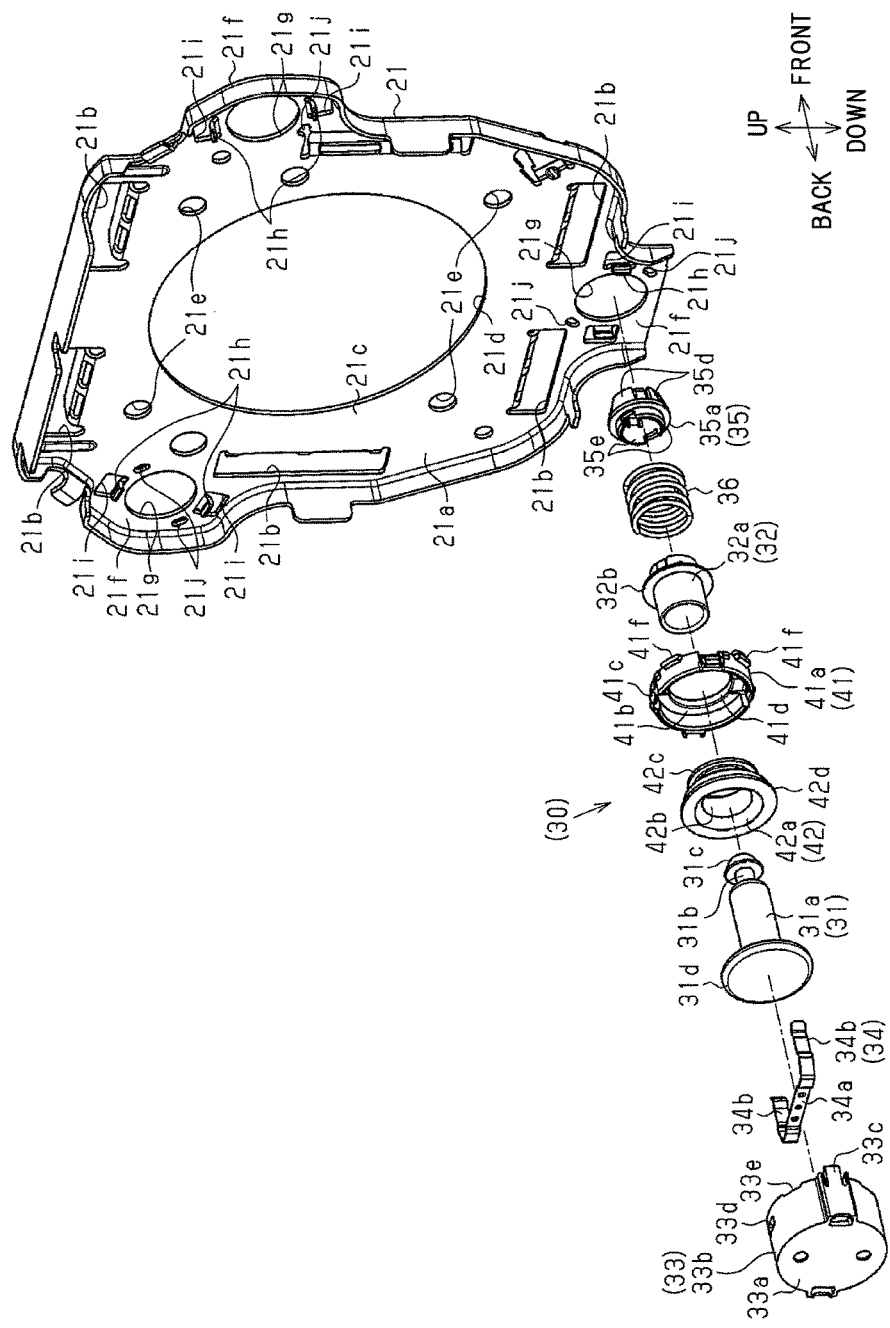
FIG. 8 is an exploded perspective view of composing parts of the horn switch mechanism of the steering wheel of the embodiment together with a bag holder.

As shown in FIGS. 3, 7 and 8, the bag holder 21 is formed by pressing a conductive metal plate. However, instead, the bag holder 21 may also be formed by die cast molding a conductive metal plate. The peripheral edge of the bag holder 21 is structured as a substantially square ring-shaped peripheral edge fixing part 21a for fixing the pad part 24.

The peripheral edge fixing part 21a includes, in the locations thereof existing forward of the engaging pawls 24d, slit-shaped pawl engaging holes 21b into which the front ends of the engaging pawls 24d are inserted and engaged.

The inside portion of the peripheral edge fixing part 21a constitutes a pedestal portion 21c. The pedestal portion 21c includes a circular opening 21d in the center thereof and also includes, in multiple locations thereof existing near the peripheral edge of the opening 21d, screw insertion holes 21e. Part of the inflator 23 is mounted on the pedestal portion 21c in such a manner that it is inserted into the opening 21d.

More specifically, the inflator 23 includes a low cylindrical main body 23a having a flange part 23b on the outer peripheral surface thereof. The flange part 23b includes multiple mounting pieces 23c respectively extending outward in the radial direction of the main body 23a. Each mounting piece 23c includes a screw insertion hole 23d in the portion thereof existing forward of the screw insertion hole 21e of the bag holder 21. Such part of the inflator 23 as exists backward of the flange part 23b is structured as a gas injection part 23e for injecting an expansion gas. And, the gas injection part 23e of the inflator 23 is inserted into the opening 21d of the bag holder 21 from front such that it projects toward the bag storage space x. Further, the flange part 23b is contacted with the peripheral edge of the opening 21d and, in this state, the inflator 23 together with the ring retainer 25 is mounted on the bag holder 21.

More specifically, the ring retainer 25 includes a circular opening 25a equivalent to the opening 21d of the bag holder 21 and also mounting screws 25b in the multiple locations thereof existing backward of the screw insertion holes 21e of the bag holder 21. Between the ring retainer 25 and bag holder 21, there is interposed the opening of the air bag (not shown) which is folded in a developable and expandable manner. The multiple mounting screws 25b of the ring retainer 25 are inserted from behind into screw insertion holes (not shown) formed in the peripheral edge of the opening of the air bag and into the screw insertion holes 21e, 23d of the bag holder 21 and inflator 23. Further, nuts 26 are fastened from front to the mounting screws 25b after inserted, whereby the air bag is fixed through the ring retainer 25 to the bag holder 21 and the inflator 23 is fixed to the bag holder 21.

In the multiple locations of the peripheral edge fixing part 21a of the bag holder 21, mounting parts 21f for mounting the horn switch mechanisms 30 are formed to project outward in the radial direction of the circular opening 21d. The mounting parts 21f are situated in such locations as exist forward of the switch support portions 24f of the pad part 24. Each mounting part 21f has a mounting hole 21g. The bag holder 21 includes, in the peripheries of the mounting holes 21g, multiple hold portions 21h formed integrally therewith and extending backward. In this embodiment, the hold portions 21h are formed by bending backward such portions of the bag holder 21 as are opposed to each other across the mounting holes 21g. Due to such bending formation of the hold portions 21h, outside the hold portions 21h of the bag holder 21, that is, oppositely to the mounting holes 21g across the hold portions 21h, there are formed holes 21i (see FIG. 10).

The bag holder 21 includes, in such multiple locations thereof as exist around the mounting holes 21g, are spaced from each other and also spaced from the hold portions 21h, transmission holes 21j penetrating through such locations. In this embodiment, the transmission holes 21j are formed two for each mounting hole 21g in locations opposed to each other across the axes (not shown) of the mounting holes 21g.

<Horn Switch Mechanism 30>

Figure 4:
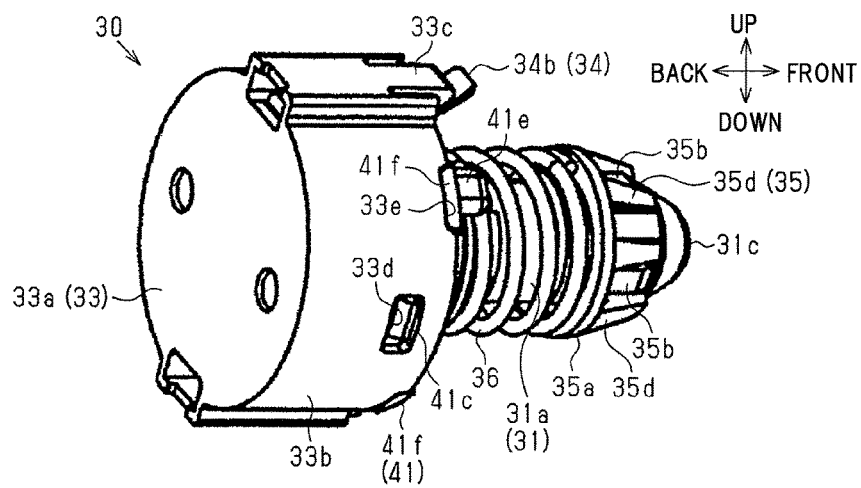
FIG. 4 is a perspective view of a horn switch mechanism included in the steering wheel of the embodiment, when it is viewed from obliquely backward.
Figure 5:
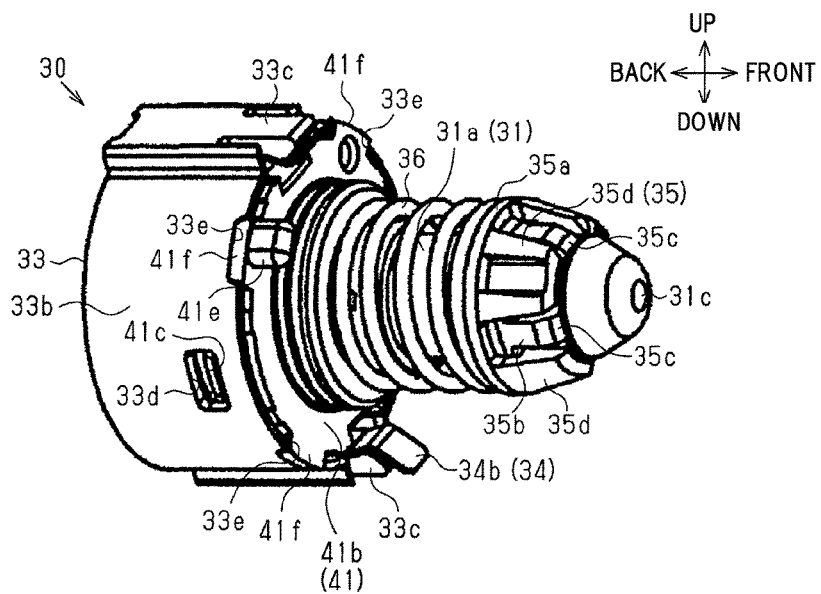
FIG. 5 is a perspective view of the horn switch mechanism of the steering wheel of the embodiment, when it is viewed from obliquely forward.

As shown in FIGS. 4, 5 and 8, each horn switch mechanism 30 includes a snap pin 31 serving as a support member, a pin holder 32 serving as a slider, a contact holder 33 serving as a cap member, a contact terminal 34 serving as a movable side contact part, a spring receiver 35, and a coil spring 36 serving as an energizing member. Next, description is given of the respective composing parts of the horn switch mechanism 30.

<Snap Pin 31 (Support Member)>

As shown in FIGS. 8 and 9, the snap pin 31 is made of a conductive metal material. A support structure with respect to the core metal 12 of the snap pin 31 is described later. The main part of the snap pin 31 is constituted of a long shaft part 31a extending in the longitudinal direction along an axis L2 parallel to the axis L1 of the steering shaft 14 and having a diameter smaller than the inside diameter of the mounting hole 21g of the bag holder 21. The snap pin 31 is inserted into the mounting hole 21g in the shaft part 31a. The rear end of the shaft part 31a functions as a fixing side contact part. On the rear side of the front end 31c in the shaft part 31a, there is formed an annular engaging groove 31b. The shaft part 31a includes, on the rear end outer peripheral portion thereof, a flange portion 31d having a diameter larger than that of the remaining portions of the shaft part 31a. The outside diameter of the flange portion 31d is set larger than the inside diameter of the mounting hole 21g of the bag holder 21.

<Pin Holder 32 (Slider)>

The pin holder 32 is formed of an insulating resin material. The main part of the pin holder 32 is constituted of a cylindrical part 32a with the front and rear ends thereof opened. The cylindrical part 32a is placed on the outside of the shaft part 31a of the snap pin 31. The pin holder 32 is used as a slider which, when the horn switch mechanism 30 is operated, slides in the longitudinal direction along the shaft part 31a.

The cylindrical part 32a includes, in the longitudinal-direction intermediate portion of the outer periphery thereof, an annular receiving portion 32b projecting outward in the diameter direction of the cylindrical part 32a. The receiving portion 32b has a function to receive the rear end of the coil spring 36. Also, the receiving portion 32b is formed in such portion of the outer periphery of the cylindrical part 32a as exists just before a transmission portion 41d (which is discussed later). Further, the outside diameter of the receiving portion 32b is set larger than a dimension simply necessary to receive the rear end of the coil spring 36. Such forming portion of the receiving portion 32b and such setting of the outside diameter thereof enable the receiving portion 32b to function also as a portion to be transmitted to which the forward movement of the damper holder 41 is transmitted through the transmission portion 41d.

<Contact Holder 33 (Cap Member)>

Figure 10:
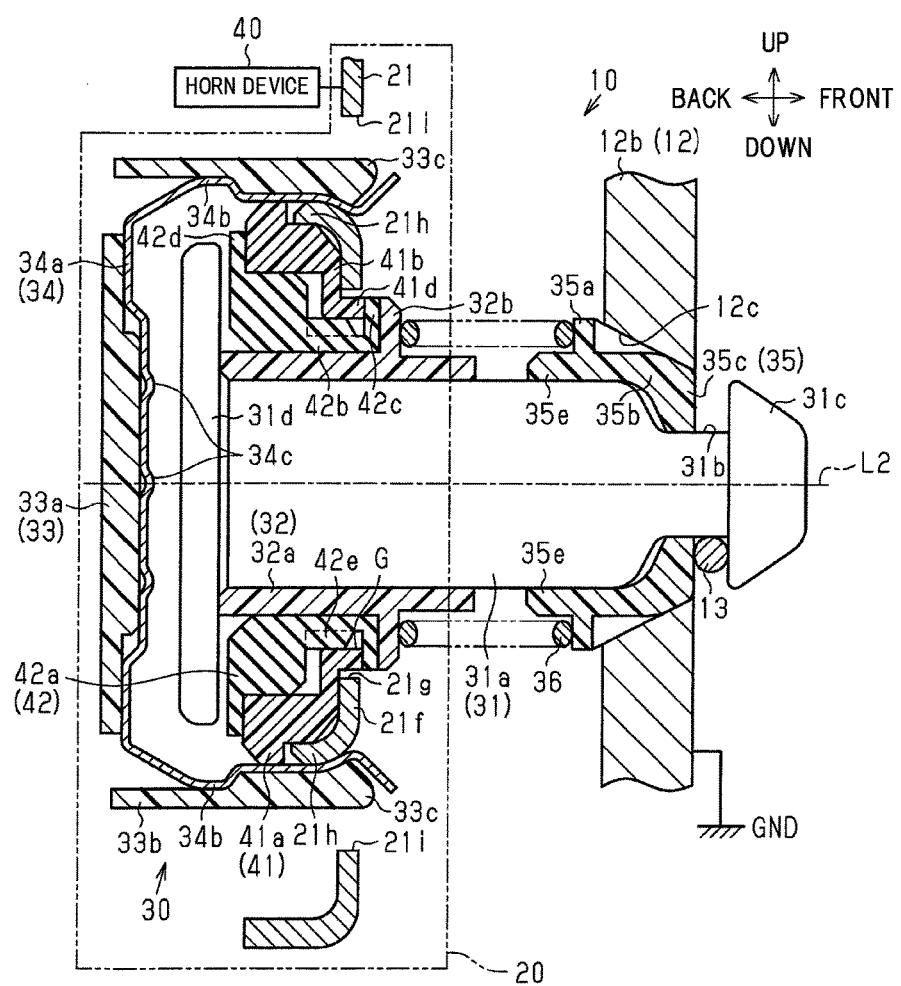
FIG. 10 is a partially longitudinal section view of the horn switch mechanism and the peripheral portions thereof, showing the section structures thereof which are different from those shown in Section (a) of FIG. 9.

As shown in FIGS. 8 and 10, the contact holder 33 is made of an insulating resin material. It includes a substantially circular plate-shaped top plate part 33a and a substantially cylindrical peripheral wall part 33b extending forward from the outer peripheral edge of the top plate part 33a. The contact holder 33, while it is separated backward from the rear end of the cylindrical part 32a of the pin holder 32, covers at least the flange portion 31d of the snap pin 31 and at least the rear end of the cylindrical part 32a of the pin holder 32. In the multiple locations of the peripheral wall part 33 spaced from each other in the peripheral direction, there are formed hook parts 33c capable of deforming elastically in the radial direction.

In the longitudinal-direction intermediate multiple locations of the peripheral wall part 33b spaced in the peripheral direction from each other, there are formed pawl engaging holes 33d (see FIGS. 4 and 5). Also, in the multiple locations of the front end of the peripheral wall part 33b spaced in the peripheral direction from each other, there are formed arc-shaped notches 33e (see FIGS. 4 and 5).

<Contact Terminal 34 (Movable Side Contact Part)>

The contact terminal 34 is formed by pressing a conductive belt-shaped metal plate. It includes a main body 34a extending in the radial direction of the contact holder 33 and a pair of lateral parts 34b respectively extending forward from the two ends of the main body 34a.

The main body 34a includes, in the longitudinal direction multiple locations thereof, multiple contact projections 34c respectively projecting forward. Most of the rear surface of the main body 34a except for the contact projections 34c is contacted with the front surface of the top plate part 33a of the contact holder 33.

The lateral parts 34b are engaged and contacted with the inner wall part 33b of the contact holder 33. Due to this engagement, the contact terminal 34 is mounted such that it is positioned by the contact holder 33.

<Spring Receiver 35>

As shown in FIGS. 5 and 10, the spring receiver 35 is formed of an insulating resin material. Part of the spring receiver 35 is constituted of an annular plate-shaped receiving part 35a. The outside diameter of the receiving part 35a is set substantially equal to the outside diameter of the coil spring 36 and the outside diameter of the rear end of the inner wall surface of the penetration hole 12, that is, the maximum diameter of the tapered inner wall surface.

Engaging pieces 35b respectively extend forward from the multiple locations of the receiving part 35a spaced in the peripheral direction from each other. Each engaging piece 35b includes, in the front end thereof, a pawl 35c projected inward in the radial direction. Also, the receiving part 35a includes multiple engaging pieces 35d extending forward from between the engaging pieces 35b mutually adjoining each other in the peripheral direction. At least part of the outside surface of each engaging piece 35d constitutes part of a taper surface whose diameter increases as it goes backward.

A pair of mounting portions 35e extend backward from the receiving part 35a. Correspondingly to the outside shape of the shaft part 31a of the snap pin 31, each mounting portion 35e is curved such that it expands outward in the radial direction of the receiving part 35a.

The receiving part 35a and two mounting portions 35e are engaged with the shaft part 31a of the snap pin 31 and the pawls 35c are inserted into the engaging grooves 31b, whereby the spring receiver 35 is irremovably mounted on the snap pin 31. As described above, in the spring receiver 35, the outside surfaces of the multiple engaging pieces 35d are arranged intermittently in the peripheral direction across the multiple engaging pieces 35b. Such structure enables the spring receiver 35 as a whole to have a shape similar to a member having a taper-shaped outer peripheral surface with the diameter thereof increasing backward.

<Coil Spring 36 (Energizing Member)>

The coil spring 36 is wound around the shaft part 31a of the snap pin 31, the cylindrical part 32a of the pin holder 32 and the two mounting parts 35e of the spring receiver 35. The coil spring 36, while compressed, is arranged between the receiving part 32b of the pin holder 32 and the receiving part 35a of the spring receiver 35, and energizes the pin holder 32 backward.

Thus, the multiple independent parts, that is, the snap pin 31, pin holder 32, contact holder 33, contact terminal 34, coil spring 36 and spring receiver 35 are formed into a unit, thereby constituting the horn switch mechanism 30 formed as an assembly. Therefore, when mounting or replacing the horn switch mechanism 30, the unit-formed horn switch mechanism 30 can be treated as a single aggregate.

<Damper Holder 41>

The damper holder 41 is formed of an insulating resin material. As shown in FIG. 9, the damper holder 41 is mainly constituted of a peripheral wall part 41a and a bottom wall part 41b formed in the front end of the peripheral wall part 41a to serve as the bottom part of the damper holder 41.

The peripheral wall part 41a has an annular shape and, within the contact holder 33, covers part of the axial-direction area of the cylindrical part 32a of the pin holder 32. The peripheral wall part 41a includes engaging pawls 41c (see FIGS. 4 and 5) in the multiple locations thereof spaced in the peripheral direction from each other. The engaging pawls 41c are engaged from inside with their corresponding pawl engaging holes 33d of the contact holder 33, whereby the damper holder 41 is mounted on the contact holder 33 (see FIGS. 4 and 5).

The bottom wall part 41b has an annular plate-like shape with the axis L2 of the snap pin 31 as its own axis, while the inner periphery thereof is situated backward of the receiving part 32b (part to be transmitted). From the inner periphery of the bottom wall part 41b, a transmission part 41d having an annular shape along the inner periphery is projected forward. The transmission part 41d, together with the inner periphery of the bottom wall part 41b, constitutes the minimum diameter part of the damper holder 41, while it is inserted into the mounting hole 21g of the bag holder 21 and is situated just behind the receiving part 32b of the pin holder 32.

As shown in FIGS. 4 and 5 and Section (b) of FIG. 9, the bottom wall part 41b includes, in the multiple locations thereof spaced in the peripheral direction from each other, transmission projections 41e respectively projecting forward. Each transmission projection 41e is engaged with its corresponding transmission hole 21j of the bag holder 21.

Engaging projections 41f are formed in such multiple locations of the front end outer periphery of the peripheral wall part 41a as are spaced in the peripheral direction from each other and also are spaced from the engaging pawls 41c in the peripheral direction. The engaging projections 41f are engaged with their corresponding notches 33e of the contact holder 33. Such engagement enables peripheral-direction positioning of the damper holder 41 with respect to the contact holder 33. Also, due to engagement of the engaging projections 41f into the notches 33e and engagement of the engaging pawls 41c into the pawl engaging holes 33d, the peripheral wall part 33b is sandwiched from both forward and backward directions, thereby enabling longitudinal-direction (axial direction) positioning of the damper holder 41 with respect to the contact holder 33.

<Elastic Member 42>

Figure 11:
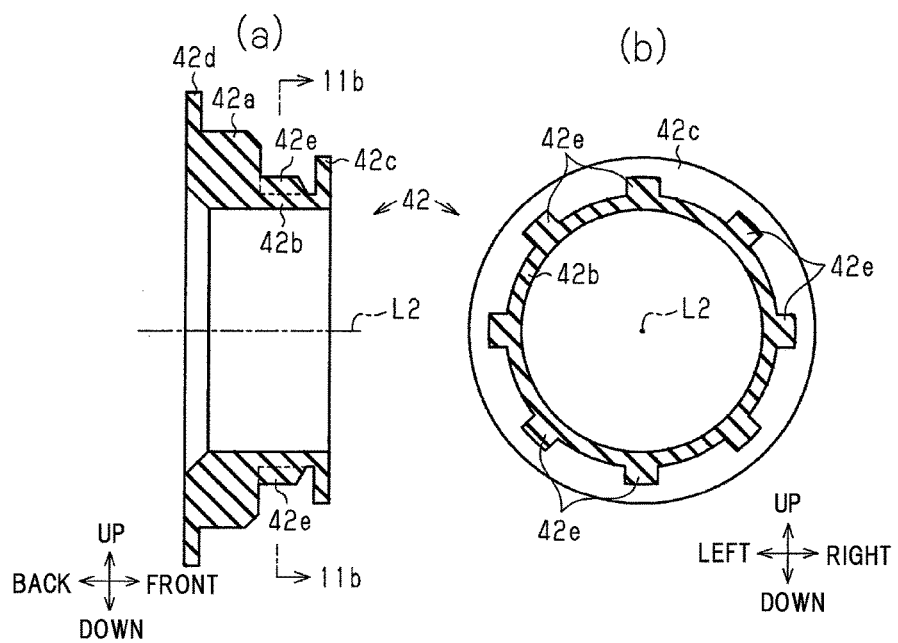
FIG. 11 is a section view of an elastic member, Section (b) of FIG. 11 being a section view taken along the 11b-11b line in Section (a) of FIG. 11.

As shown in Section (b) of FIG. 9, and FIG. 11, the elastic member 42 includes an elastic main body 42a, an elastic cylindrical part 42b and an elastic plate-shaped part 42c, and is interposed between the pin holder 32 and damper holder 41. The whole elastic member 42 is formed of elastic material such as rubber (for example, EPDM and silicon rubber) and elastomer.

The elastic main body 42a has an annular shape with the axis L2 of the snap pin 31 as its own axis and constitutes the main part of the rear side of the elastic member 42. The elastic main body 42a is spaced backward from a member existing on the forward side of the elastic main body 42a, that is, the bottom wall part 41b of the damper holder 41, while it is also spaced from a member existing on the backward side thereof, that, the flange part 31d of the snap pin 31. Also, the elastic main body 42a includes, on the rear end outer peripheral part thereof, an annular projection 42d projecting outward in the radial direction. The annular projection 42d is spaced inward in the radial direction from the peripheral wall part 33b of the contact holder 33.

The elastic cylindrical part 42b is formed in a cylindrical shape having a diameter smaller than the minimum diameter part (the inner periphery of the bottom wall part 41b and transmission part 41d) of the damper holder 41 and extends forward from the inner periphery of the elastic main body 42a. Thus, the elastic cylindrical part 42b adjoins the front side of the elastic main body 42a.

The elastic member 42 has an annular gap part G extending in the peripheral direction between the outer peripheral surface of the elastic cylindrical part 42b and the minimum diameter part (the inner periphery of the bottom wall part 41b and transmission part 41d) of the damper holder 41. Therefore, the gap part G is situated in such location of the elastic member 42 as is shifted in the axial direction from the elastic main body 42a.

In the multiple (an even number of) locations of the gap part G spaced in the peripheral direction from each other, there are formed elastic restriction portions 42e integrally with the elastic cylindrical part 42b which fill the above locations of the gap part G to restrict the elastic deformation of the elastic member 42 in these locations. The restriction portions 42e are formed at equal angles in an even number of (four or more) locations (in this embodiment, eight locations) around the axis L2 of the elastic member 42 in the outer peripheral surface of the elastic cylindrical part 42b. Each restriction portion 42e is situated at a location opposed to the other one restriction portion 42e across the axis L2.

The restriction portions 42e respectively extend in parallel to the axis L2. The rear ends of the restriction portions 42e are connected to the elastic main body 42a. The front ends of the restriction portions 42e are spaced backward from the elastic plate-shaped part 42c. The outer peripheral surfaces of the restriction portions 42e are in surface contact with or close to the minimum diameter part (the inner periphery of the bottom wall part 41b and transmission part 41d) of the damper holder 41.

The elastic plate-shaped part 42c projects outward in the radial direction from the front end outer periphery of the elastic cylindrical part 42b. The outside diameter of the elastic plate-shaped part 42c is set larger than the elastic cylindrical part 42b and substantially equal to the outside diameter of the receiving part 32b (the part to be transmitted). The thickness (the dimension in a direction along the axis L2) of the elastic plate-shaped part 42c is set smaller than the projection length of the elastic plate-shaped part 42c from the elastic cylindrical part 42b. The elastic plate-shaped part 42c enters between the transmission part 41d of the damper holder 41 and the receiving part 32b of the pin holder 32. The front face of the elastic plate-shaped part 42c is contacted with the receiving part 32b, while the rear face thereof is contacted with is contacted with the transmission part 41d. Thus, the transmission part 41d is indirectly contacted through the elastic plate-shaped part 42c with the receiving part 32b.

The elastic main body 42a of the elastic member 42, together with the air bag device 20, constitutes a dynamic damper. In this embodiment, the elastic main body 42a functions as a spring of a dynamic damper, while the air bag device 20 functions as a damper mass.

Here, by tuning the size (such as radial-direction and longitudinal-direction dimensions) of the elastic main body 42a, the vertical direction and right-and-left direction resonance frequencies of the dynamic damper are set for target vibration damping frequencies, that is, desired vibration damping frequencies with respect to the vibrations of the steering wheel 10 in the vertical direction and in the right and left directions.

As shown in Section (a) of FIG. 9 and FIG. 10, in a state where the horn switch mechanisms 30, as described above, are mounted on the bag holder 21 through the elastic member 42 and damper holder 41, the pin holder 32, while preventing contact between the snap pin 31 and bag holder 21, that is, while insulating them from each other, supports the bag holder 21 in such a manner that it can be moved back and forth with respect to the snap pin 31. The pin holder 32 intervenes between the shaft part 31a of the snap pin 31 and the lateral parts 34b of the contact terminal 34 to insulate the shaft part 31a and lateral parts 34b from each other. Also, the pin holder 32 transmits the backward energizing force of the coil spring 36 to the flange part 31d of the snap pin 31.

Also, the paired sandwich portions 21h enter between the damper holder 41 and the lateral parts 34b of the contact terminal 34. The hook parts 33c of the contact holder 33 bring the lateral part 34b into contact with the outer surfaces of the sandwich portions 21h, thereby attaining conduction between the bag holder 21 and contact terminal 34.

Further, the front ends of the lateral parts 34b energized by the hook parts 33c are engaged with the sandwich portions 21h. The lateral parts 34b restrict the contact holder 33 and thus the horn switch mechanisms 30 from moving backward from the bag holder 21.

Next, description is given of an operation to assemble the air bag device 20 to the core metal 12 through the above structured multiple horn switch mechanisms 30.

As shown in Section (a) of FIG. 9 and FIG. 10, in this operation, the snap pin 31 of each of the horn switch mechanisms 30 is inserted from behind into the corresponding penetration hole 12c of the hold portion 12b of the core metal 12. With this insertion, the receiving part 35a of the spring receiver 35 approaches the hold portion 12b and the engaging piece 35d approaches the inner wall surface of the penetration hole 12c. Also, the front end 31c of the shaft part 31a of the snap pin 31 comes into contact with the clip 13. Further, when the snap pin 31 or the like is moved forward against the energizing force of the clip 13, the clip 13 is elastically deformed outward in the radial direction of the snap pin 31. And, when the snap pin 31 is moved up to a location where the engaging groove 31b is opposed to the clip 13, the clip 13 is going to enter the engaging groove 31b due to its own elastic restoring force.

Meanwhile, the pawl part 35c of the spring receiver 35 energized forward by the coil spring 36 has been inserted into the engaging groove 31b. Thus, the clip 13, in a process where it enters the engaging groove 31, while compressing the coil spring 36 backward, enters between the pawl part 35c and front end 31c. With this entrance, within the engaging groove 31b, the pawl part 35c is situated behind the clip 13. Such location of the clip 13 as is situated in front of the penetration hole 12c is sandwiched from ahead and from behind by the pawl part 35c energized forward by the coil spring 36 and front end 31c. Thus, the snap pin 31 is locked to the core metal 12 by the clip 13, whereby the horn switch mechanisms 30 are fastened to the core metal 12 and the air bag device 20 is mounted on the core metal 12. The structure for locking the snap pin 31 to the core metal 12 due to the elasticity of the clip 13 caused by insertion thereof into the penetration hole 12c is also called a snap fit structure.

Next, description is given of the operation of the steering wheel 10 of the above structured embodiment.

In a normal time when any impact caused by a front collision and the like is not applied to a vehicle from ahead, in the air bag device 20, a gas is not injected from the gas injection part 23e of the inflator 23 but the air bag remains folded.

In the above normal time, when the air bag device 20 is not depressed, as shown in Section (a) of FIG. 9 and FIG. 10, the contact projection 34c of the contact terminal 34 is separated backward from the rear end (fixing side contact part) of the snap pin 31. This shuts off conduction in the contact terminal 34 and snap pin 31, thereby preventing the horn device 40 against operation. In this case, the backward energizing force of the coil spring 36 is applied through the pin holder 32 to the flange part 31d of the snap pin 31 locked to the core metal 12 by the clip 13.

Also, the forward energizing force of the coil spring 36 is applied to the spring receiver 35 through the receiving part 35a, and the pawl part 35c of the spring receiver 35 inserted into the engaging groove 31b of the snap pin 31 presses forward the clip 13 within the engaging groove 31b. Due to this pressing operation, the clip 13 is sandwiched from back and forth by the front end 31c and pawl part 35c, whereby the movement thereof is restricted.

In this case, the load of the air bag device 20 is transmitted to the pin holder 32 mainly through the contact holder 33, damper holder 41 and elastic member 42.

Here, the rear end of the cylindrical part 32a of the pin holder 32 is separated forward from the top plate part 33a of the contact holder 33. Thus, the load of the air bag device 20 is not transmitted direct to the pin holder 32 through the contact holder 33.

Therefore, in the above normal time, when, while the vehicle is running at high speeds or an on-vehicle engine is idling, vibrations in the vertical direction and in the right and left directions are transmitted to the steering wheel 10, such vibrations are transmitted to the air bag device 20 through the core metal 12 and the respective horn switch mechanisms 30. More specifically, the vibrations are transmitted through the snap pin 31, pin holder 32, elastic member 42 and damper holder 41 to the contact holder 33 and bag holder 21. Transmission of vibrations between the damper holder 41 and bag holder 21 is carried out through the transmission projection 41e and transmission hole 21j (see Section (b) of FIG. 9).

When vibrations are transmitted in the above manner, according to the vibrations, the air bag device 20 functions as the damper mass of the dynamic damper and the elastic main body 42a of the elastic member 42 functions as the spring of the dynamic damper.

Thus, the elastic main body 42a, while deforming elastically at resonance frequencies identical with or close to the target frequencies of the vibrations of the steering wheel 10, vibrates (resonates) in the vertical direction and in the right and left directions with the air bag device 20, thereby absorbing the vibration energy of the steering wheel 10. This energy absorption controls (damps) the respective vibrations of the steering wheel 10 in the vertical direction and in the right and left directions.

Here, in the damper holder 41, the inner periphery of the bottom wall part 41b and annular transmission part 41d constitute the minimum diameter part thereof. The elastic cylindrical part 42b of the elastic member 42 is smaller in diameter than the inner periphery of the bottom wall part 41b and transmission part 41d. Between such location of the elastic member 42 as situated adjacent to the front side of the elastic main body 42a and the outer peripheral surface of the elastic cylindrical part 42b having a smaller diameter than the minimum diameter part of the damper holder 41, there is formed the annular gap G extending in the peripheral direction of the elastic cylindrical part 42b.

However, the multiple locations of the gap part G spaced from each other in the peripheral direction are filled by elastic restriction portions 42e formed on the outer peripheral surface of the elastic cylindrical part 42b. The restriction portions 42e restrict elastic deformation of such locations of the gap G of the elastic cylindrical part 42b as are filled by the restriction portions 42e. This restriction prevents the steering wheel 10 from oscillating with the elastic member 42 as the fulcrum.

Meanwhile, as described above, when the elastic restriction portions 42e are formed, to a reacting force generated due to the elastic deformation of the elastic main body 42a, there is added a reacting force generated by the restriction portions 42e filling the gap G, whereby the elastic member 42 is hard to deform elastically. However, formation of the restriction portions 42e is limited to the multiple locations spaced from each other in the peripheral direction of the gap G. Therefore, when compared with a structure in which the whole gap is filled by the restriction portions 42e, an increase in the reacting force caused by additional formation of the restriction portions 42e is small.

Further, in this embodiment, each restriction portion 42e is situated at a location which is opposed to the other one restriction portion 42e across the axis L2 of the elastic member 42. Thus, the function to restrict the elastic deformation of the elastic cylindrical part 42b and the function to control an increase in the reacting force caused by addition of the restriction portions 42e are fulfilled at locations opposed to each other across the axis L2 of the elastic member 42.

Also, in this embodiment, the function to restrict the elastic deformation of the elastic cylindrical part 42b and the function to control an increase in the reacting force caused by addition of the restriction portions 42e are fulfilled by the eight restriction portions 42e arranged at equal angles around the axis L2 of the elastic member 42.

Each restriction portion 42e, when compressed in the vertical direction and in the right and left directions into elastic deformation, is in part going to deform elastically in a forwardly swelling manner. Here, supposing the restriction portions 42e are contacted with the elastic plate-shaped part 42c situated in front of the restriction portions 42e, the elastic plate-shaped part 42c is going to obstruct the forward elastic deformation of the restriction portions 42e. Also, due to the above contact, there is generated a friction force between the restriction portions 42e and elastic plate-shaped part 42c, whereby the restriction portions 42e are harder to elastically deform forward.

However, in this embodiment, the restriction portions 42e are spaced backward from the elastic plate-shaped part 42c. Clearances between the restriction portions 42e and elastic plate-shaped part 42c allow the restriction portion 42e to elastically deform forward. The restriction portions 42e are hard to come into contact with the elastic plate-shaped part 42c, whereby a friction force to be generated by such contact is hard to occur.

Here, when the elastic main body 42a is deformed in a direction along the axis L2 of the snap pin 31, generation of striking sounds due to contact of the peripheral wall part 41a with the flange part 31d is controlled by an annular projection 42d intervening between them.

Also, the elastic plate-shaped part 42c of the elastic member 42 is small in thickness but has some degree of elasticity. Thus, intervention of the elastic plate-shaped part 42c between the transmission part 41d and receiving part 32b prevents direct contact between the hard transmission part 41d and hard receiving part 32b, thereby preventing occurrence of striking sounds due to contact between hard members.

Meanwhile, in the above normal time, when the horn device 40 is operated to press down the air bag device 20, a force applied to the air bag device 20 is transmitted to the contact terminal 34 and damper holder 41 through the contact holder 33 of at least one of the horn switch mechanisms 30. This force presses the damper holder 41 forward to move it forward together with the transmission part 41d. The movement of the transmission part 41d is transmitted through the receiving part 32b (the part to be transmitted) to the pin holder 32. That is, while the transmission part 41d moves forward together with the damper holder 41, the movement thereof is transmitted indirect through the elastic plate-shaped part 42c of the elastic member 42 to the receiving part 32b situated just before the transmission part 41d. The receiving part 32b, in addition to the function to receive the backward energizing force of the coil spring 36, functions as the part to be transmitted, thereby receiving a forward force transmitted from the damper holder 41 (transmission part 41d).

This force transmission causes the pin holder 32 to slide forward along the shaft part 31a of the snap pin 31 against the coil spring 36. Also, the contact terminal 34 moves forward together with the contact holder 33.

Figure 12:
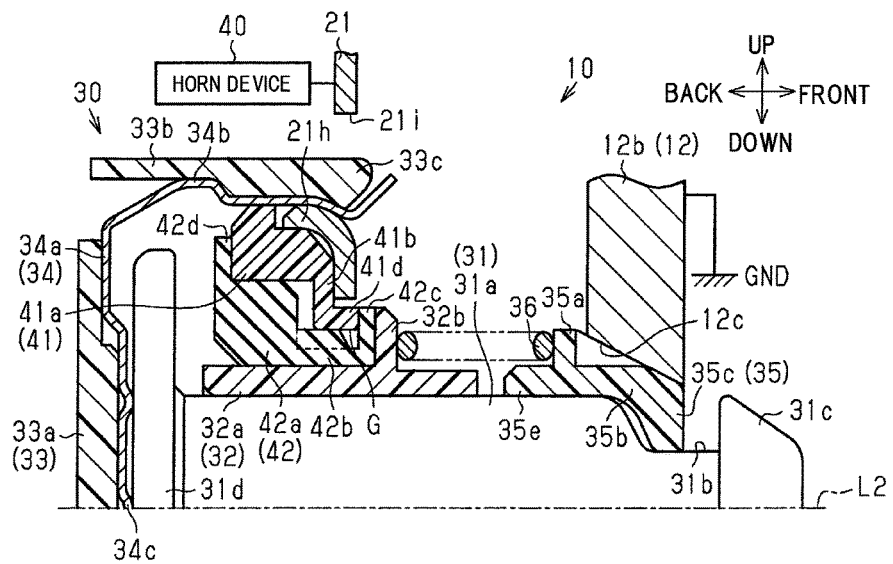
FIG. 12 is a partially longitudinal section view of part of the section structures of the horn switch mechanism and the peripheral portions thereof, when the air bag device is depressed from the state of FIG. 10.
Figure 13:
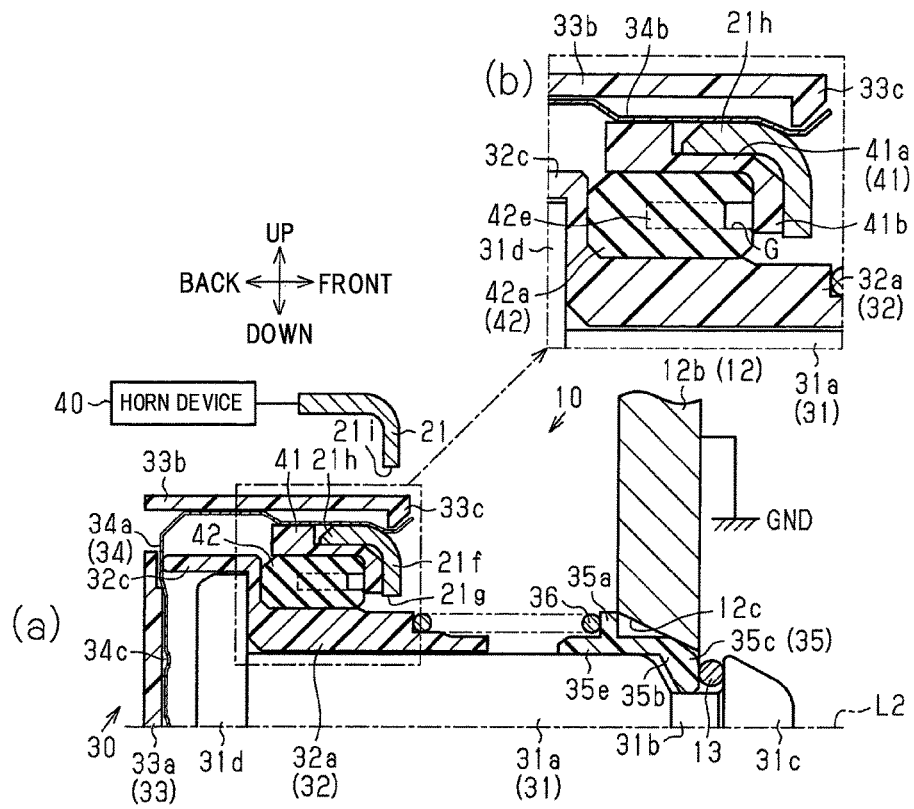
FIG. 13 is a partially longitudinal section view of the section structures of a horn switch mechanism and the peripheral portions thereof in a steering wheel according to a modification, Section (b) of FIG. 13 being a partially longitudinal section view of part of Section (a) of FIG. 13 which is shown enlargedly.

And, as shown in FIG. 12, when at least one of the multiple contact projections 34c of the contact terminal 34 is contacted with the rear end face (fixing side contact part) of the snap pin 31, the core metal 12 connected to a ground GND (vehicle body earth) and bag holder 21 are put into conduction through the clip 13, snap pin 31 and contact terminal 34. This conduction closes the horn switch mechanisms 30 and operates the horn device 40 electrically connected to the bag holder 21.

Here, when an impact is applied from ahead to the vehicle due to a front collision or the like, a driver is going to incline forward through inertia. Meanwhile, in the air bag device 20, the inflator 23 is operated according to the impact to inject a gas from the gas injection part 23e. This gas is supplied to the air bag, thereby developing and expanding the air bag. When a pressing force against the skin portion 24a is increased by the air bag, the skin portion 24a is broken in the reduced-thickness portion 24c. The air bag is continuously developed and expanded backward through an opening formed by such breakage. The developed and expanded air bag is disposed in front of the driver going to incline forward due to the front-collision impact, thereby restraining the forward inclination of the driver to protect the driver against the impact.

In the backward expansion of the air bag, a backward force is applied to the bag holder 21. In this respect, according to this embodiment, the snap pins 31 for their associated horn switch mechanisms 30 are supported by the core metal 12 (hold part 12b). The flange part 31d formed in the rear end of each snap pin 31 is situated backwardly of the mounting hole 21g of the bag holder 21. And, the flange part 31d has an outside diameter larger than the inside diameter of the mounting hole 21g. Therefore, when the bag holder 21 moves backward, the flange part 31d is contacted with the periphery of the mounting hole 21g of the bag holder 21, thereby functioning as a stopper. Thus, the flange part 31d of the snap pin 31 prevents the bag holder 21 and thus the air bag device 20 from moving backward excessively.

According to the embodiment specifically described above, the following effects can be obtained.

(1) The elastic member 42 includes, in the location thereof shifted in the axial direction from the elastic main body 42a, the annular gap G extending in the peripheral direction thereof. In the multiple locations of the gap G spaced from each other in the peripheral direction thereof, there are formed the elastic restriction portions 42e (Section (a) of FIG. 9 and Section (b) of FIG. 11) for filling the above locations of the gap G to restrict the elastic deformation of such locations of the elastic member 42.

This can prevent such parts of the elastic member 42 as face the gap G from being elastically deformed in the gap G and thus the steering wheel 10 from oscillating with the elastic member 42 as the fulcrum thereof.

Also, when compared with a structure in which the whole of the gap G is filled by the restriction portions 42e, an increase in a reacting force caused by additional formation of the restriction portions 42e can be reduced, thereby enabling reduction of occurrence of a problem that such additional formation of the elastic portions 42e makes the elastic member 42 difficult to deform elastically.

As a result, the frequency characteristics of vibrations to be controlled by the elastic main body 42 can be made hard to be influenced by the remaining parts of the elastic member 42, thereby stabilizing them.

(2) The elastic member 42 includes, in such location thereof as adjoins the front side of the elastic main body 42a, the elastic cylindrical part 42b having a diameter smaller than the minimum diameter part of the damper holder 41, while the gap G is formed between them. However, the multiple restriction portions 42e are formed in the outer peripheral surface of the elastic cylindrical part 42b (Section (b) of FIG. 9).

Therefore, the restriction portions 42e can restrict the elastic cylindrical part 42b from deforming elastically in the gap G and an increase in a reacting force caused by additional formation of the restriction portions 42e can be prevented, whereby the above (1) effects can be obtained.

(3) The inner periphery of the annular bottom wall part 41b formed in the front end part of the damper holder 41 constitutes at least a portion of the minimum diameter part of the damper holder 41 (Section (b) of FIG. 9). Therefore, elastic deformation of the elastic cylindrical part 42b of the elastic member 42 between the minimum diameter part of the damper holder 41 and itself can be restricted by the multiple restriction portions 42e formed on the outer peripheral surface of the elastic cylindrical part 42b, and an increase in a reacting force caused by additional formation of the restriction portions 42e can be prevented, whereby the above (1) effects can be obtained.

(4) The pin holder 32 is energized backward by the coil spring 36 (energizing member). The contact holder 33 (cap member) spaced backward from the rear end of the pin holder 32 covers at least the rear ends of the snap pin 31 and pin holder 32. The contact terminal 34 (movable side contact part) is mounted within the contact holder 33. The rear end of the snap pin 31 constitutes the fixing side contact part. The damper holder 41 is mounted on the contact holder 33 (Section (a) of FIG. 9).

Also, in the inner periphery of the bottom wall part 41b of the damper holder 41, there is formed the transmission part 41d constituting, together with this inner periphery, the minimum diameter part of the damper holder 41. The pin holder 32 includes, in such location of the outer periphery as exists just before the transmission part 41d, the receiving part 32b (part to be transmitted) to which the forward movement of the damper holder 41 is transmitted through the transmission part 41d (Section (b) of FIG. 9).

Therefore, while the air bag device 20 is not depressed, the multiple peripheral-direction locations of the gap G between the elastic cylindrical part 42b and the minimum diameter part of the damper holder 41 can be filled by the restriction portions 42e formed in the outer peripheral surface of the elastic cylindrical part 42b. This can restrict the gap G from deforming elastically in the above locations and also can prevent an increase in a reacting force caused by additional formation of the restriction portions 42e.

Also, when a depressing force is applied to the air bag device 20, the depressing force is transmitted to the pin holder 32 (slider) through the contact holder 33, the transmission part 41d of the damper holder 41, and receiving part 32b (portion to be transmitted), thereby enabling the pin holder 32 to slide forward against the coil spring 36 (energizing member). In such sliding process, the contact terminal 34 (movable side contact part) is contacted with the fixing side contact part of the rear end of the snap pin 31 (support member), thereby enabling the horn device 40 to operate.

(5) The elastic member 42 includes, in the front end of the elastic cylindrical part 42b, the elastic plate-shaped part 42c having a diameter larger than the elastic cylindrical part 42b. The transmission part 41d is indirectly contacted with the receiving part 32b (part to be transmitted) through the elastic plate-shaped part 42c (Section (b) of FIG. 9).

Thus, when the air bag device 20 is depressed, the forward movement of the transmission part 41d caused by the forward movement of the damper holder 41 can be indirectly transmitted to the receiving part 32b (part to be transmitted) through the elastic plate-shaped part 42c. The pin holder 32 (slider) can be made to slide forward against the coil spring 36. As a result, the above (4) effects can be suitably obtained.

(6) The restriction portions 42e are spaced backward from the elastic plate-shaped part 42c (Section (b) of FIG. 9).

Thus, the restrict parts 42e can be made easy to elastically deform forward. Also, when the restriction portions 42e deform elastically, they are made hard to come into contact with the elastic plate-shaped part 42c, thereby preventing generation of a frictional force due to contact. This can reduce the influence of the restriction portions 42e on the frequency characteristics of vibrations to be controlled by the elastic main body 42a.

(7) The number of the restriction portions 42e is even and one of them is disposed at a location opposed to the other restriction portion 42e across the axis L2 of the elastic member 42 (Section (a) of FIG. 11).

Thus, the elastic cylindrical part 42b serving as such part of the elastic member 42 as faces the gap G can fulfill in good balance the function to restrict the elastic deformation of thereof in the gap G and the function to prevent an increase in a reacting force caused by additional formation of the restriction portions 42e at two locations opposed to each other across the axis L2 of the elastic member 42, that is, on both sides in the vibrating direction.

(8) The restriction portions 42e are arranged at equal angles in an even number of (four or more) locations around the axis L2 of the elastic member 42 (Section (b) of FIG. 11).

Thus, an effect to stabilize the frequency characteristics of vibrations to be controlled by the elastic main body 42a can be obtained regardless of the assembling position of the elastic member 42 in the peripheral direction.

Here, the above embodiment can also be enforced as a modification in which it is changed in the following manner.

<Pin Holder 32 (Slider)>

The part to be transmitted in the cylindrical part 32a of the pin holder 32 may also be formed in other location than the receiving part 32b.

The part to be transmitted may also be formed integrally with the cylindrical part 32a or separately.

The part to be transmitted may be formed integrally with or separately from the cylindrical part 32a.

<Contact Holder 33 (Cap Member)>

The contact holder 33 may also cover, in addition to the rear ends of the snap pin 31 and pin holder 32, parts existing forward of such rear ends.

<Energizing Member>

The energizing member may also be constituted of a spring different from a coil spring or an elastic member different from a spring, so long as it energizes the pin holder 32 (slider) backward.

<Damper Holder 41>

The transmission part 41d may not always have an annular shape but it may also be formed at multiple locations on a circle around the axis L2 of the snap pin 31 and may have an arc shape along the circle.

<Elastic Member 42>

The gap G may also be formed in such location of the elastic member 42 as is shifted backward from the elastic main body 42a.

In this case, the gap G may also be formed in a location adjacent to the elastic main body 42a, or a location spaced from the elastic main body 42a.

The gap G, as in the above embodiment, may be formed in a location forwardly adjacent to the elastic main body 42a, but may also be formed in a location spaced forward therefrom.

The number of the restriction parts 42e may also be changed so long as it is multiple.

The shape of the restriction portions 42e may also be changed into different shapes from the above embodiment.

In this case, the shape of the restriction portions 42e may also be changed into a shape which, instead of surface contact, is line contacted or point contacted with the minimum diameter part of the damper holder 41 (the inner periphery of the bottom wall part 41b, and transmission part 41d).

As shown in FIG. 15, the elastic member 42 may also have the gap G in the diameter-direction inner periphery thereof. For example, the elastic cylindrical part 42b may have a diameter larger than that of the cylindrical part 32a of the pin holder 32 and may be spaced outward in the diameter direction from the cylindrical part 32a. In this case, the elastic member 42 has the gap G between the elastic cylindrical part 42b and cylindrical part 32a. And, the restriction portions 42e may also be formed at such multiple locations of the inner peripheral surface of the elastic cylindrical part 42c as are spaced from each other in the peripheral direction.

The elastic member 42 may also be formed integrally with the cylindrical part 32a of the pin holder 32. This can be attained, for example, by a so called insert molding method in which the pin holder 32 is arranged within a metal mold as an insert member and an elastic member is charged outside the cylindrical part 32a of the pin holder 32.

The elastic plate-shaped part 42c may not always have an annular shape.

The elastic member 42 may also exclude the elastic plate-shaped part 42c. In this case, the transmission part 41d of the damper holder 41 is contacted directly with the receiving part 32b (part to be transmitted) of the pin holder 32.

<Others>

The horn switch mechanisms 30 may also have a structure shown in Section (a) of FIG. 13. In this modification, a cylindrical increased diameter part 32c is formed in the rear end of the cylindrical part 32a of the pin holder 32. The increased diameter part 32c surrounds the flange part 31d of the snap pin 31. The rear end of the increased diameter part 32c is in contact with or close to the top plate part 33a of the contact holder 33.

And, when the air bag device 20 is depressed, a force applied to the air bag device 20 is directly transmitted through the contact holder 33 and increased diameter part 32c to the pin holder 32. When the pin holder 33 is made to slide forward against the coil spring 36, the contact projection 34c of the contact terminal 34 (movable side contact part) is contacted with the rear end (fixing side contact part) of the snap pin 31, thereby operating the horn device 40.

This structure excludes the transmission part 41d of the damper holder 41.

Also, as shown in Section (b) of FIG. 13, the elastic member 42 may also have a gap G in the diameter-direction intermediate part thereof. With this elastic member 42, the inner peripheral surface thereof comes into contact with the outer peripheral surface of the cylindrical part 32a of the pin holder 32 and the outer peripheral surface thereof comes into contact with the inner peripheral surface of the peripheral wall part 41a of the damper holder 41.

Figure 14:
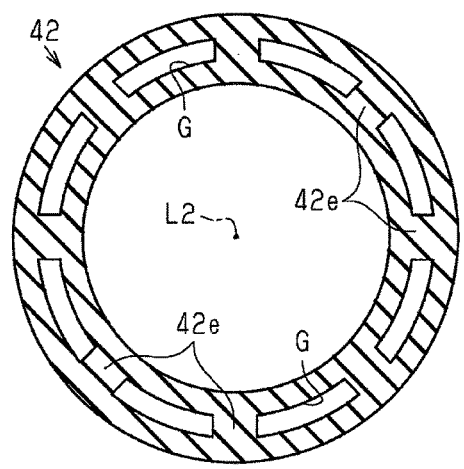
FIG. 14 is a section view of an elastic member in FIG. 13.

In this case, as shown in FIG. 14, the elastic restriction portions 42e are formed at the multiple locations of the gap G which are spaced from each other in the peripheral direction. They are formed in an even number and, preferably, one restriction portion 42e may be arranged at a location opposed to the other restriction portion 42e across the axis L2 of the elastic member 42. Also, the restriction portions 42e may preferably be arranged at equal angles in an even number of (four or more) locations around the above axis L2.

The above steering wheel can also be applied to other conveyance than the vehicle, for example, a steering apparatus for use in an aircraft and a vessel.

What is claimed is:

1. A steering wheel, comprising:
   a support member inserted into a bag holder of an air bag device;
   a cylindrical slider placed longitudinally slidably over the support member;
   an annular damper holder configured to cover a part of an axial-direction area of the cylindrical slider; and
   an elastic member including an annular elastic main body interposed between the cylindrical slider and the annular damper holder, wherein:
   the air bag device configured to act as a damper mass of a dynamic damper;
   the annular elastic main body configured to act as a spring of the dynamic damper;

an annular gap, extending in the peripheral direction of the elastic member, is formed with the elastic member at a portion shifted in the axial direction from the annular elastic main body;

the elastic member further includes elastic restriction portions configured to fill the annular gap to restrict the elastic deformation of the elastic member at the multiple portions of the annular gap spaced from each other in the peripheral direction;

the elastic member includes an elastic cylindrical part having a diameter smaller than the minimum diameter part of the annular damper holder at a portion adjacent to the front side of the annular elastic main body;

the annular gap is formed between the outer peripheral surface of the elastic cylindrical part and the minimum diameter part of the annular damper holder; and the restriction portions are respectively formed on the outer peripheral surface of the elastic cylindrical part.

2. The steering wheel according to claim 1, wherein:

the annular damper holder includes an annular bottom wall part in the front end thereof; and the inner periphery of the bottom wall part constitutes at least a portion of the minimum diameter part of the annular damper holder.

3. The steering wheel according to claim 2, further comprising:

an energizing member configured to energize the cylindrical slider backward;

a cap member configured to cover at least the respective rear ends of the support member and the cylindrical slider while being spaced backward from the rear end of the cylindrical slider;

a movable side contact part mounted within the cap member; and a fixing side contact part constituted of the rear end of the support member and configured to contact with the movable side contact part when operating a horn device, wherein:

the annular damper holder is mounted on the cap member;

the annular damper holder includes a transmission part, constituting together with the inner periphery the minimum diameter part of the annular damper holder, in the inner periphery of the bottom wall part; and the cylindrical slider includes a part to be transmitted, to which the forward movement of the annular damper holder is transmitted through the transmission part, at the portion of the outer periphery thereof as exists just before the transmission part.

4. The steering wheel according to claim 3, wherein:

the elastic member includes an elastic plate-shaped part, having a diameter larger than the elastic cylindrical part, in the front end of the elastic cylindrical part;

the transmission part is indirectly contacted with the part to be transmitted through the elastic plate-shaped part; and the restriction portions are spaced backward from the elastic plate-shaped part.

5. The steering wheel according to claim 1, wherein the restriction portions are formed in an even number while one of the restriction portions is arranged at a portion opposed to the other across the axis of the elastic member.

6. The steering wheel according to claim 1, wherein the restriction portions are formed at equal angles in an even number and four or more portions around the axis of the elastic member.

* * * * *